(No Model.) 2 Sheets—Sheet 1.
J. J. KING.
BIRD STARTER.

No. 550,918. Patented Dec. 3, 1895.

WITNESSES:
William Miller
Chas. E. Poersgen

INVENTOR:
Jeremiah J. King
BY
Hauff & Hauff
ATTORNEYS.

(No Model.) 2 Sheets—Sheet 2.
J. J. KING.
BIRD STARTER.
No. 550,918. Patented Dec. 3, 1895.
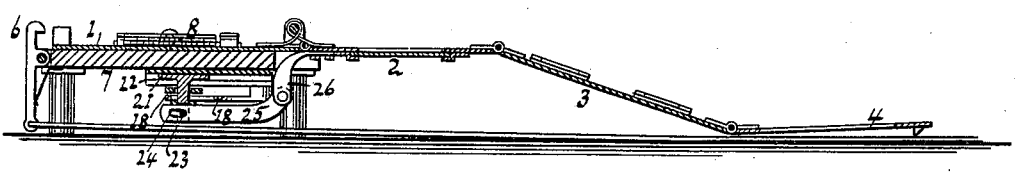
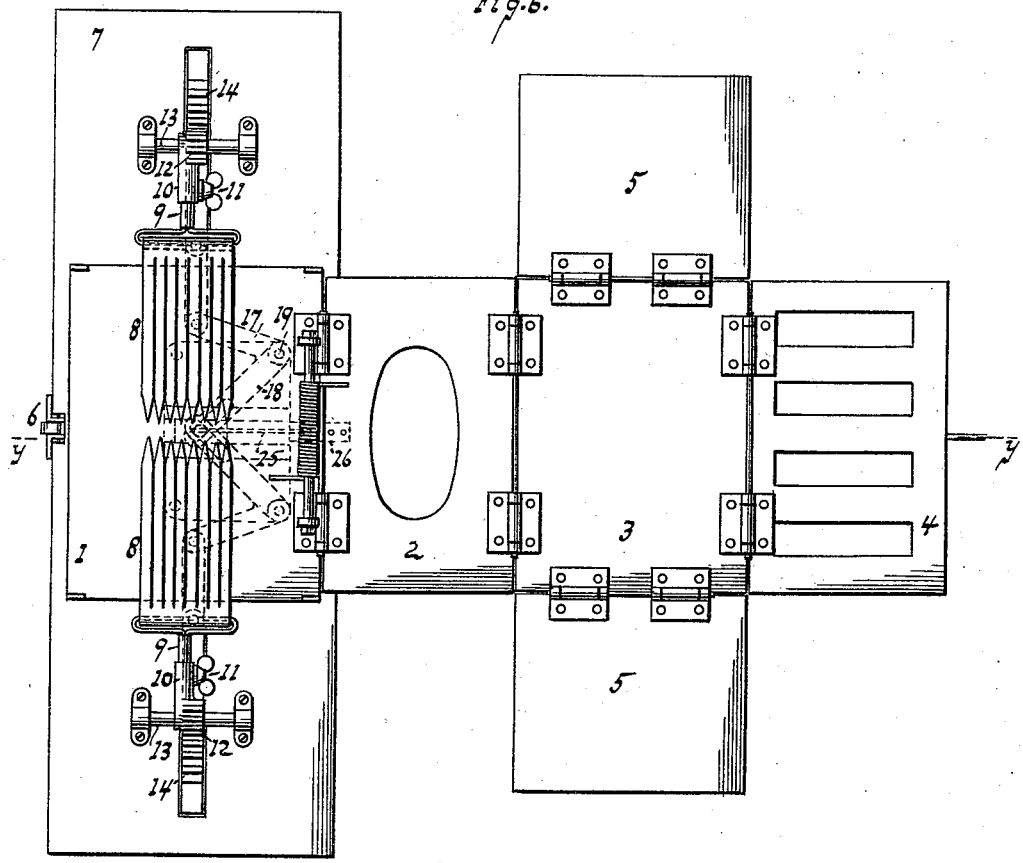
WITNESSES:
William Miller
Chas. E. Poensgen
INVENTOR:
Jeremiah J. King
BY
Hauff & Hauff
ATTORNEYS.

UNITED STATES PATENT OFFICE.

JEREMIAH J. KING, OF NEW YORK, N. Y.

BIRD-STARTER.

SPECIFICATION forming part of Letters Patent No. 550,918, dated December 3, 1895.

Application filed March 28, 1895. Serial No. 543,568. (No model.)

*To all whom it may concern:*

Be it known that I, JEREMIAH J. KING, a citizen of the United States, residing at New York, in the county and State of New York, have invented new and useful Improvements in Bird-Starters, of which the following is a specification.

The object of this invention is to provide traps used for releasing birds or pigeons to be shot at on the wing with a starter which will drive the bird from the trap to insure flight; and the invention resides in the novel features of construction set forth in the following specification and claims and illustrated in the annexed drawings, in which—

Figure 1:
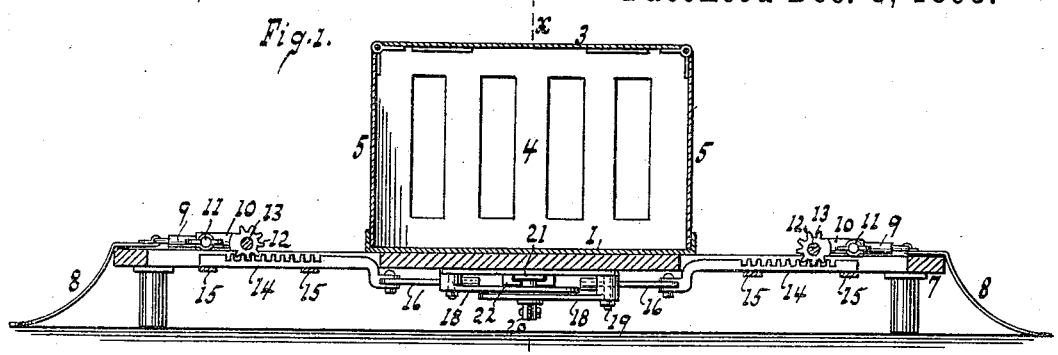
Figure 2:
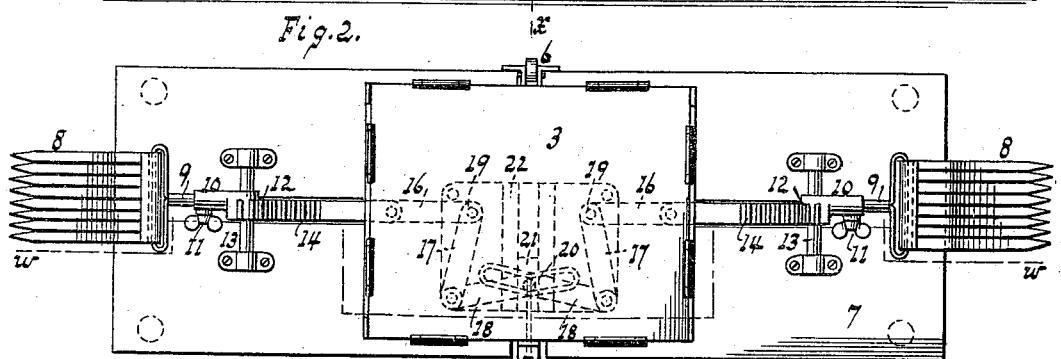
Figure 3:
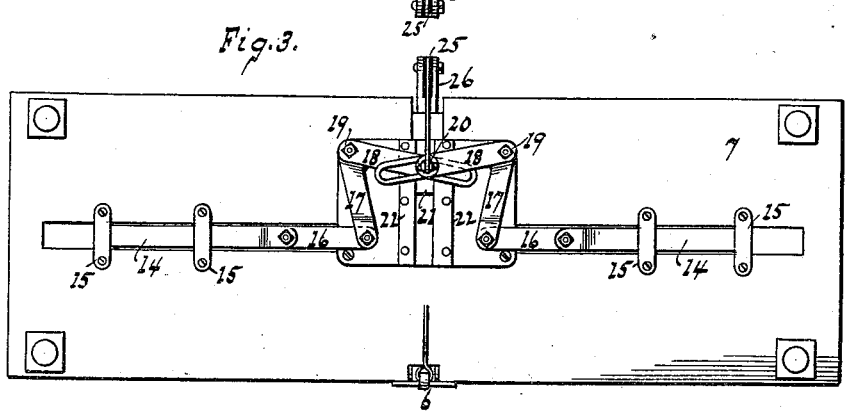
Figure 4:
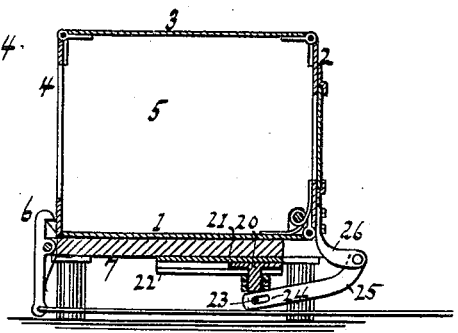

Figure 1 is a section of a trap with a starter sectioned along *w w*, Fig. 2. Fig. 2 is a plan view of a trap closed and of a starter. Fig. 3 is an inverted plan view of Fig. 2. Fig. 4 is a section along *x x*, Fig. 1, the trap being closed. Fig. 5 is a section like Fig. 4, the trap being open. Fig. 6 is a plan view of the trap open and of the starter.

The trap comprises the walls or portions 1, 2, 3, 4, and 5, the part 1 forming the trap-bottom, 2 the back, 3 the top, 4 the front, and the parts 5 the sides. The parts are jointed or movably secured together, so that upon release of the catch 6, holding the trap closed, the latter spreads open, as seen in Fig. 6 and as well known. The bottom 1 is shown supported by a base 7.

In the drawings are shown two flaps or starters 8, but manifestly the starting devices instead of being in duplicate can be single, if deemed fit. These flaps 8 by being of soft or pliable material, such as cords or leather strips, will not be apt to injure the bird if the latter be struck thereby.

Each flap 8 is shown carried by a stem 9 and 10, comprising a rod and socket portion secured together by screw 11, so that the stem 9 and 10 can be lengthened or shortened to bring the flap into proper adjustment. The stem portion 10 extends from a gear 12, having the shaft or pivot 13. With the gear 12 engages a rack 14, reciprocating on guides 15. The link 16 is jointed to the rack 14 and to the arm 17 of a two-armed lever 17 18, said lever being fulcrumed at 19. The lever-arm 18 is slotted for the passage of a pin or stud 20 on slide 21, traveling along way 22. A pin-and-slot connection 23 and 24 unites pin 20 with link 25, jointed to tail 26, extending from the movable trap portion 2.

When the trap is closed, the sliding pin 20 has been drawn back, as also the lever-arm 18, moving lever-arm 17 with rack 14 inward or toward the trap and rotating the gear 12 with the flap 8 away from the trap to the position shown in Figs. 1 and 2. When the trap is snapped open or the parts spread, as in Figs. 5 and 6, the opening swing of trap part 2 will move tail 26 and link 25 with pin 20, so as to move the lever-arm 17 with rack 14 outward or away from the trap, the consequent rotation of gear 12 throwing the flap 8 inward, as seen in Fig. 6, so as to frighten or start the bird which has been contained in the trap.

The movable connection 23 and 24 will allow the trap part 2 with link 25 a certain swing or lost motion in opening before the link 25 begins to actuate pin 20 with lever 18 17 and rack 14, so that the trap will be fairly open by the time the flap 8 has been swung to its inward position.

Manifestly the closing of the trap will swing the flap back to its outward position. (Shown in Fig. 1.)

What I claim as new, and desire to secure by Letters Patent, is—

1. A trap provided with a movable portion or wall, combined with a flap, and an actuating arm for said flap connected to and actuated by said movable trap portion substantially as described.

2. A trap provided with a movable portion or wall, combined with a flap, an actuating arm for said flap, and a lever connected to said arm and actuated by the movable trap portion substantially as described.

3. A trap provided with a movable portion or wall, combined with a flap, an actuating arm for said flap, a lever connected to said arm, and a link made to loosely connect the movable trap portion and lever to allow the movable trap portion motion independently of the flap substantially as described.

4. A trap provided with a movable portion or wall, a slide, a link made to connect the slide to the movable trap portion, a lever and rack actuated by said slide, and a flap having a gear engaged by said rack substantially as described.

5. The combination with a trap the parts of which are hinged or jointed together to spread open, of a tail connected to one of said parts, a link jointed to said tail, a slide loosely connected to said link, a lever connected to said slide, a rack connected to said lever, and a gear engaged by said rack, said gear being provided with a flap substantially as described.

6. The combination with a trap the parts of which are hinged or jointed together to spread open, of a tail connected to one of said parts, a link jointed to said tail, a slide loosely connected to said link, a lever connected to said slide, a rack connected to said lever, and a gear engaged by said rack, said gear being provided with a flap adjustably secured to the gear substantially as described.

7. The combination with a trap the parts of which are hinged or jointed together to spread open, of a flap connected to and adapted to be swung toward and from the trap by the opening and closing of the latter substantially as described.

In testimony whereof I have hereunto set my hand in the presence of two subscribing witnesses.

JEREMIAH J. KING.

Witnesses:
WM. C. HAUFF,
E. F. KASTENHUBER.